2 Sheets—Sheet 1.
L. M. HAM & J. H. DODGE.
Wagon.
No. 3,975. Reissued May 17, 1870.
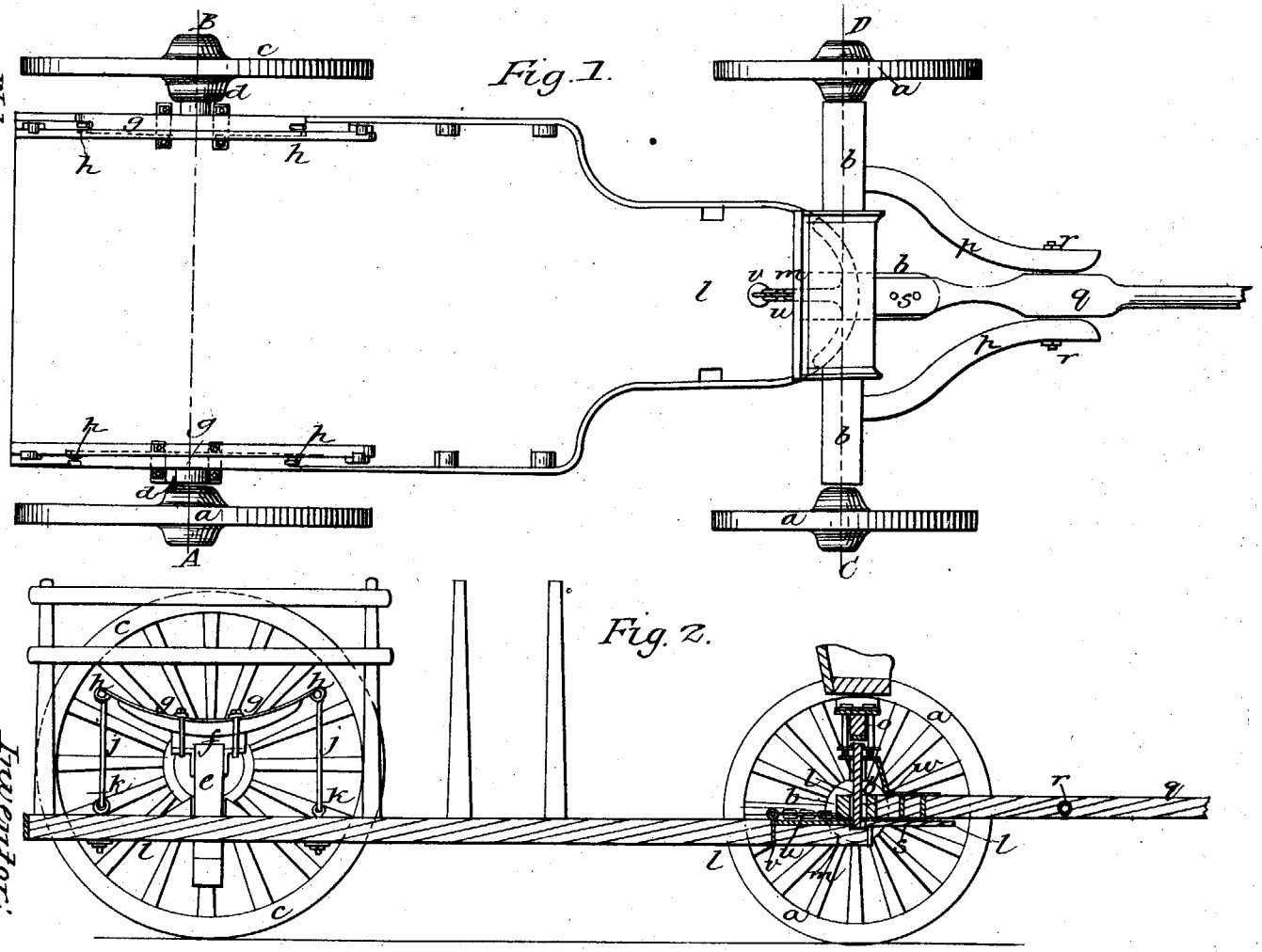
Witnesses:
W. A. Hayward
John W. Ellis.
Inventor:
L. M. Ham
John H. Dodge
N. PETERS, Photo-Lithographer, Washington, D. C.

2 Sheets—Sheet 2.
L. M. HAM & J. H. DODGE.
Wagon.
No. 3,975. Reissued May 17, 1870.
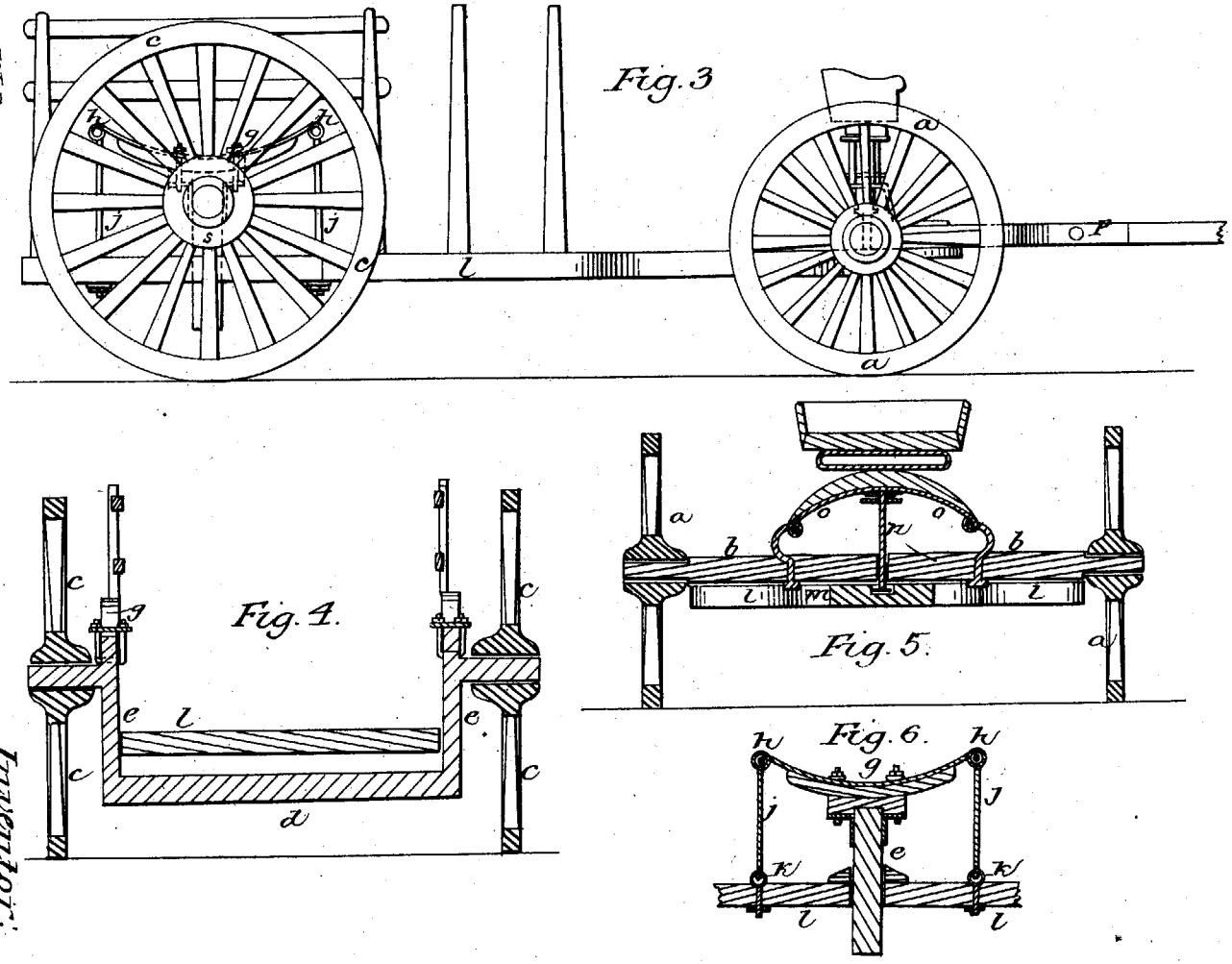
Witnesses:
W. A. Hayward
John W. Ellis
Inventor:
L. M. Ham
John H. Dodge
N. PETERS, Photo-Lithographer, Washington, D. C.

United States Patent Office.

L. M. HAM, OF BOSTON, AND JOHN H. DODGE, OF CHELSEA, MASSACHUSETTS.

*Letters Patent No.* 39,345, *dated July* 28, 1863; *reissue No.* 3,975, *dated May* 17, 1870.

IMPROVEMENT IN WAGONS.

The Schedule referred to in these Letters Patent and making part of the same

*To all persons to whom these presents shall come:*

Be it known that we, L. M. HAM, of Boston, in the county of Suffolk and State of Massachusetts, and JOHN H. DODGE, of Chelsea, in the county and State aforesaid, have invented certain new and useful Improvements in Wagons; and that the following description, taken in connection with the accompanying drawings hereinafter referred to, forms a full and exact specification of the same, wherein we have set forth the nature and principles of our said improvement by which our invention may be distinguished from all others of a similar class, together with such parts as we claim and desire to have secured to us by Letters Patent.

In the accompanying plate of drawings—

Figure 1 is a plan or top view of our improvements.

Figure 2 is a central longitudinal vertical section through the wagon.

Figure 3 is a side view.

Figures 4 and 5 are transverse vertical sections taken respectively in the planes of the lines A B and C D, fig. 1.

Figure 6 is a detail view, to be hereinafter referred to.

The present invention relates to certain new and useful improvements in the construction and arrangement of that class of wagons in which the body or bed is placed below the centers or axes of the wheels.

Heretofore, in the wagons of this class, the body has been attached directly to the axle-trees without the interposition of springs, because, by the use of springs in that manner, it (the body) would be raised to so great a height as to effectually obviate the many advantages that would otherwise accrue from having the same as low as possible, and, moreover, the refuse matter of the streets, &c., would easily collect upon the springs, thus necessitating a frequent cleaning of the same, to prevent corrosion, &c.

As the advantages of having the body low and near the ground are evident to all conversant with the use of wagons, they therefore need not be herein set forth; but it is further apparent that if springs could be attached to the body in such a manner, that while not increasing the distance of the same from the ground, they will yet sustain its weight and the load upon the same, and thus relieve the axles of the "dead weight" which would be necessarily upon them if the body was secured directly to the same, as is now the case. The friction and wear and tear of the parts composing the wagons would be thereby greatly diminished, and, moreover, an easier and a less jarring motion produced upon the merchandize, &c., conveyed, the most important advantages of which results are that the expense of repairs, &c., is greatly lessened, and that a much heavier load can be at one and the same time carried, &c.

The object of the present invention, and which is secured thereby, is, therefore, to so attach to the body of the wagons any suitable springs, elliptical, &c., as not to increase thereby its height from the ground and also secure the many advantages above set forth.

We accomplish this result by securing to each end of the hind axle-tree above the axes of the whole a semi-elliptical spring, to each extremity of which one end of a vertical rod is attached the lower end being permanently fastened in the body of the wagon, and also by passing the bolt or rod upon which the front axle-tree turns up through the same, and then securing its upper end to the top portion of an elliptical spring arranged on the front axle-tree.

By thus arranging the springs and attaching the same to the body, it is evident that the body can be placed in as low a position as may be desired and expedient, and that the springs are easy of access and wholly removed from the mud, &c., of the street.

We have also made other improvements, consisting:

First, in a peculiar mode of attaching the front axle-tree to the body of the wagon, whereby its center bolt or rod is relieved from strain or tension as the wagon is drawn; and Second, in a peculiar manner of arranging the pole and attaching it to the wagon, the object of which is to prevent the chafing of the horses' necks, &c., as will presently be described.

Having thus stated the objects of the present invention, we will now proceed to describe in detail the construction and operation of the same.

*a a*, in the accompanying drawings, represent the forward wheels of the wagon turning upon axes of the front axle-tree *b*.

*c c* are the rear wheels turning upon axes of the rear axle-tree *d*.

The rear axle-tree *d* has upright arms, *e e*, upon the upper ends *f* of which are permanently fastened, by bolts and nuts, semi-elliptical springs, *g g*.

To the ends *h* of these springs *g* are attached, so as to swing loosely thereon, the upper ends of vertical rods *j j*, &c., the lower ends of which are passed around stationary staples *k*, &c., of the wagon-body *l*.

This body *l* is placed between the upright arms *e e*, above referred to, and has its forward end *m* placed below the front axle-tree *b*, to which it is attached by a vertical rod or bolt, *n*, passing loosely upward through the same, and on which it turns or swings as a center, which rod, at its upper end is secured to a semi-elliptical rubber, or any other suitable spring, *o*, placed longitudinally upon the said axle-tree, and secured thereto in any proper manner.

Thus it will be seen that the body of the wagon in lieu of being attached directly to the axle-trees of the same, as has heretofore been the case, is so hung upon or sustained by any suitable springs, arranged substantially as described, as to successfully accomplish the desired results aimed at in the present invention, the many advantages of which have been hereinbefore specified.

*p p* are the futchells securely fastened at one end to the front axle-tree *b*.

Between the inside surfaces of these futchells, *p p*, the pole or shaft *q* is placed, and attached thereto, so as to turn upon a center or fulcrum, *r*, of the same.

The rear or inner end *s* of the said pole *q* rests upon the extended portion *t* of the body *l*, and has attached to the same the right angular vertical arm *a'*, upon the horizontal portion of which the central part of the front spring *o* bears in its vertical movement, thus causing a depression or elevation of the inner end of the pole as the body of the wagon is raised from the load upon the same, the said arm *a'* being guided by and moving upon the center bolt before referred to, of the front axle-tree, and the pole itself turning upon its fulcrum in the futchell.

Thus it will be seen that the inner end of the pole is made to rise or lower in a vertical plane through the medium of its arm *a'* and the extended portion *t*, or rest of the body, in direct proportion to the amount of weight upon the wagon-body, thus correspondingly decreasing or increasing the vertical height of the front end of the pole.

But, however, as the front axle-tree to which the poles or shafts are attached, is always free to turn in its wheels, it is evident that the outer end of the pole would, were no means adopted to prevent it, always have a tendency to fall to the ground, thus bearing upon and straining the neck or other portion of the drafting-horse to which the shafts or pole through the harness may be attached.

And thus, in the present invention, by connecting the pole with the spring of the front axle-tree, and allowing it to turn in its futchells, as described, it is perfectly apparent that the said fulcrum can be so arranged that the ordinary pressure upon the springs by the body only will cause the downward pressure of the inner end of the pole from the same to exactly counteract the tendency, as specified, of the outer end of the pole to fall to the ground, thereby securing the pole in a perfectly horizontal position, as desired.

And it is also further evident than in increasing the weight of the wagon-body, from the loading of the same, the greater will be the tendency of the front axle-tree to turn in its wheels, and also the greater will be the depression of the inner end of the pole, as described; but these two movements of the outer and inner end of the pole always by our new and peculiar arrangement counteract each other, as is apparent without further description, thus causing the hole to be always in a horizontal position, but, however, sometimes in a higher or lower plane, as the case may be.

And we may here remark that one great advantage of our arrangement of the pole over all others which have heretofore been used for the same purpose is that the pole always adjusts itself to the load, and must necessarily come to a horizontal position.

To relieve the vertical bolt *n* of the front axle-tree *b* from the strain transversely, which it is evident necessarily would come upon it as the wagon was drawn, we have arranged the following device, viz:

*u* is a chain or cord, fastened at one end to the axle-tree, *b*, and at the other to a fixed staple, *v*, of the body.

Thus, it is apparent that, allowing a sufficient play to the axle-tree *b* upon the bolt *n*, which can be done by simply elongating the hole or aperture *w* for the same, the usual tension heretofore upon the bolt is transferred through the connecting chain *u* to the fixed staple *v* of the body, a great desideratum long desired to be obtained in wagons.

Having thus described our improvement, we shall state our claims, as follows:

We do not claim, broadly, the use of springs for wagons; but

What we do claim as our invention, and desire to have secured to us by Letters Patent, is—

1. Hanging the front end of the wagon-body upon any suitable spring or springs below the front axle-tree of the same, by means of the center axle-bolt or rod *n*, substantially in the manner described and for the purpose specified.

2. The means herein described for obviating the strain upon the center bolt or rod of the front axle-tree, the same consisting of the connecting-chain *u* and fixed staple *v*, arranged with regard to the same, and operating substantially as described.

3. The arrangement of the pole with regard to the body, the spring, and the futchell of the front axle-tree, substantially as herein described and for the purpose specified.

L. M. HAM.
J. H. DODGE.

Witnesses:
EDWIN W. BROWN,
H. L. RICH.